United States Patent
Harada et al.

(10) Patent No.: US 8,213,374 B2
(45) Date of Patent: Jul. 3, 2012

(54) MOBILE COMMUNICATION METHOD, RADIO BASE STATION, MOBILE STATION, AND PROCESSOR

(75) Inventors: Atsushi Harada, Kawasaki (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 261 days.

(21) Appl. No.: 12/597,335

(22) PCT Filed: Apr. 23, 2008

(86) PCT No.: PCT/JP2008/057979
§ 371 (c)(1),
(2), (4) Date: Jan. 14, 2010

(87) PCT Pub. No.: WO2008/133309
PCT Pub. Date: Nov. 6, 2008

(65) Prior Publication Data
US 2010/0120378 A1 May 13, 2010

(30) Foreign Application Priority Data
Apr. 24, 2007 (JP) .............................. P2007-114899

(51) Int. Cl.
*H04W 4/00* (2009.01)
(52) U.S. Cl. ....................................................... 370/329
(58) Field of Classification Search .................. None
See application file for complete search history.

(56) References Cited

U.S. PATENT DOCUMENTS

2005/0254456 A1* 11/2005 Sakai et al. .................... 370/328
2007/0286080 A1* 12/2007 Kim et al. ..................... 370/236

OTHER PUBLICATIONS

International Search Report w/translation from PCT/JP2008/057979 dated Aug. 5, 2008 (2 pages).
Written Opinion from PCT/JP2008/057979 dated Aug. 5, 2008 (3 pages).
3GPP TSG RAN WG1 Meeting #47bis; R1-070106; "Uplink Timing Control for E-UTRA"; NTT DoCoMo et al.; Sorrento, Italy; Jan. 15-19, 2007 (2 pages).
3GPP TSG RAN WG1 #48bis; R1-071478; "UL Synchronization Management in LTE_ACTIVE"; Texas Instruments; St. Julians, Malta; Mar. 26-30, 2007 (4 pages).

* cited by examiner

*Primary Examiner* — Raj Jain
(74) *Attorney, Agent, or Firm* — Osha Liang LLP (57) ABSTRACT

A mobile communication method according to the present invention includes the steps of: (A) activating, at the radio base station (eNB), a first timer, upon transmission of a downlink data signal to the mobile station (UE) operating in a continuous reception cycle; (B) transmitting, from the radio base station (eNB) to the mobile station (UE), a change instruction instructing the mobile station (UE) to change a reception cycle of the mobile station (UE) from the continuous reception cycle to a first discontinuous reception cycle, and releasing the uplink dedicated resources, when the first timer expires with no downlink data signal transmitted after the activation of the first timer; and (C) changing, at the mobile station (UE), the reception cycle of the mobile station (UE) from the continuous reception cycle to the first discontinuous reception cycle, and releasing the uplink dedicated resources, in response to the received change instruction.

8 Claims, 9 Drawing Sheets

MOBILE COMMUNICATION METHOD, RADIO BASE STATION, MOBILE STATION, AND PROCESSOR

TECHNICAL FILED

The present invention relates to a mobile communication method in which a mobile station transmits a control signal to a radio base station through uplink dedicated resources. The present invention also relates to the radio base station, the mobile station, and a processor.

BACKGROUND ART

Standardization of radio access schemes, such as "LTE (Long Term Evolution)", has recently been underway by the 3GPP. Such radio access schemes are configured so that signals from mobile stations UE are orthogonal to each other if difference in reception timings of signals from the mobile stations UE in a radio base station eNB is within a certain range (the length of a cyclic prefix given to each information symbol in a radio sub-frame).

To maintain the orthogonality of signals from the mobile stations UE, namely, to make the difference in reception timings of signals from the mobile stations UE in the radio base station eNB fall within the certain range, the transmission timing of a signal in each mobile station UE needs to be corrected. For correcting the transmission timing, the radio base station eNB measures an offset between the reception timing of a signal from each mobile station UE and a reference reception timing, and notifies the mobile station UE of the measured offset.

Figure 1:
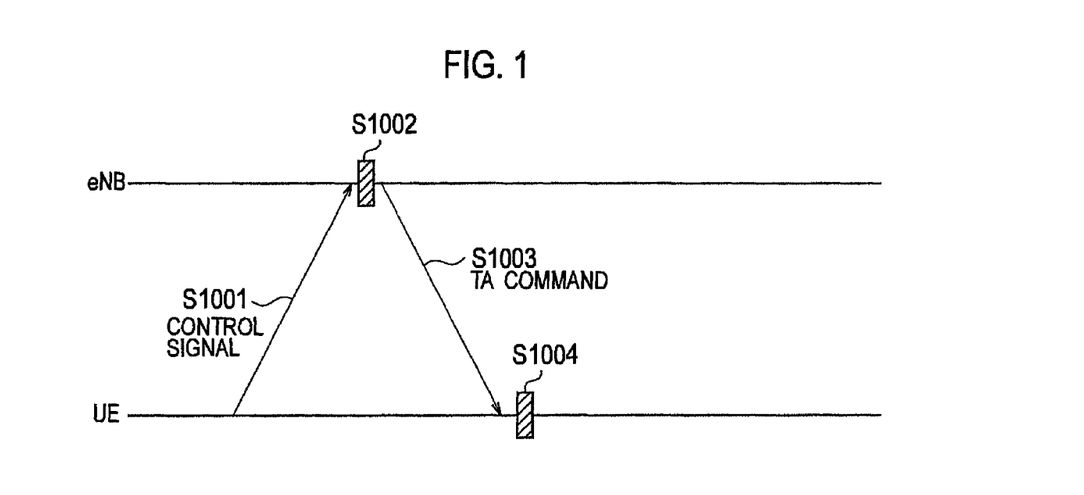
FIG. 1 is a diagram illustrating a procedure for maintaining uplink synchronization between a radio base station and a mobile station in a conventional mobile communication system.

FIG. 1 illustrates an example of such operation. As FIG. 1 shows, in Step S1001, a mobile station UE transmits a control signal (such as Sounding Reference Signal, CQI information, and Scheduling Request) through uplink dedicated resources (e.g., PUCCH: Physical Uplink Control Channel) set up with a radio base station eNB (see Non-patent Document 1).

In Step S1002, the radio base station eNB measures an offset between a reception timing of the received control signal and the reference reception timing.

In Step S1003, as a MAC-control-PDU, the radio base station eNB transmits a TA (Timing Advance) command to the mobile station UE, in order to notify of a result of the measurement.

In Step S1004, according to the measurement result thus notified by the received TA command, the mobile station UE adjusts a transmission timing of an uplink data signal.

Meanwhile, radio access schemes, such as LTE, are configured to employ a DRX (Discontinuous Reception) technique in order to save power consumption by the mobile stations UE.

Figure 2:
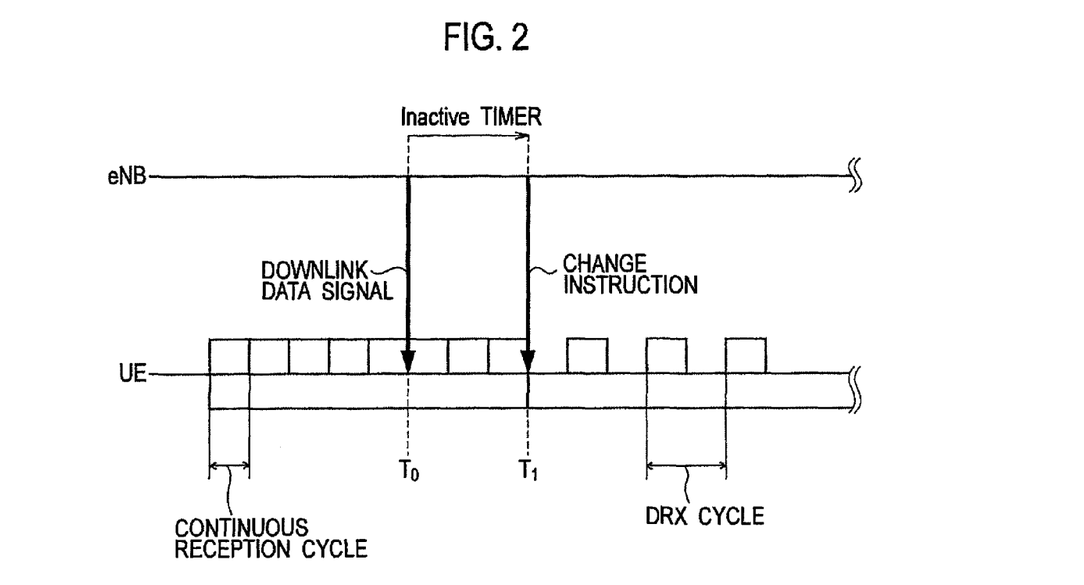
FIG. 2 is a diagram illustrating a procedure for changing a reception cycle of the mobile station to a DRX cycle in the conventional mobile communication system.

Specifically, such radio access schemes are configured as FIG. 2 shows. At T0, an Inactive timer (first timer) is activated, when a radio base station eNB transmits a downlink data signal through downlink shared resources (e.g., DL-SCH: Downlink Shared Channel) to a mobile station UE operating in a continuous reception cycle. Then, at T1, the radio base station eNB transmits, to the mobile station UE, a change instruction instructing the mobile station UE to change the reception cycle of the mobile station UE from the continuous reception cycle to a DRX cycle, when the Inactive timer expires with no downlink data signal transmitted after the activation of the Inactive timer.

Then the mobile station UE is configured to change the reception cycle of downlink data signals in the mobile station UE from the continuous reception cycle to a DRX cycle, in response to the change instruction received from the radio base station eNB.

Non-patent Document 1: 3GPP TSG RAN WG1 Meeting #47bis R1-070106, Jan. 15, 2007

DISCLOSURE OF THE INVENTION

Figure 3:
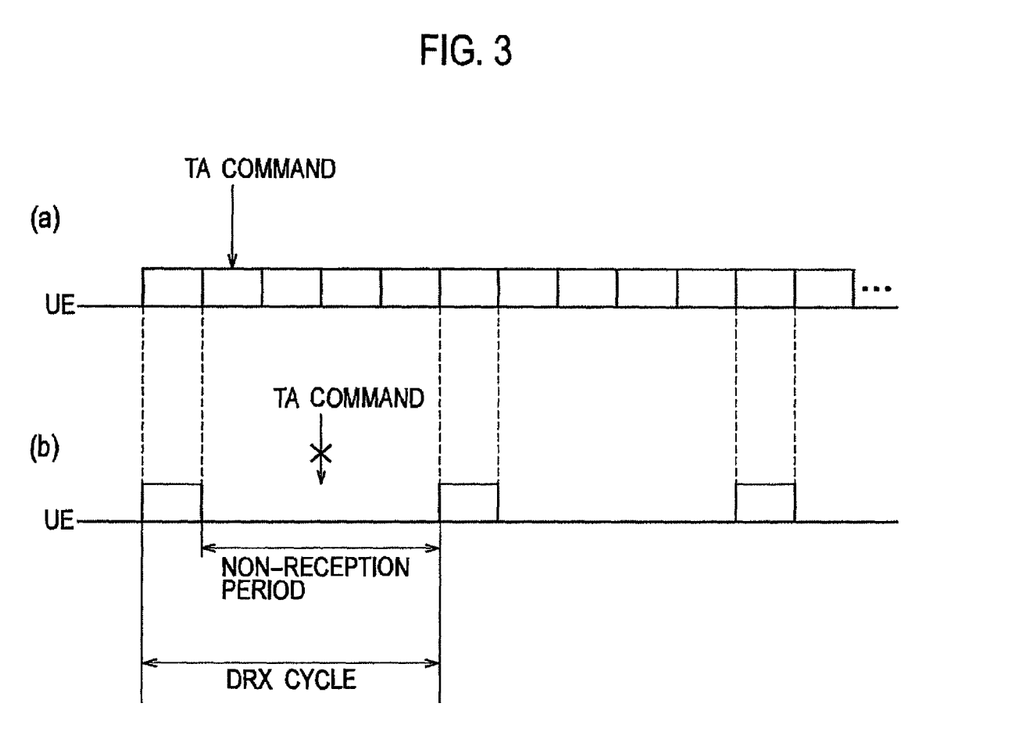
FIG. 3 is a diagram illustrating a problem in the conventional mobile communication system.

As FIG. 3(a) shows, while a reception cycle of a downlink data signal in the mobile station UE is the continuous reception cycle, the mobile station UE can always receive the TA command transmitted from the radio base station eNB. However, as FIG. 3(b) shows, after the reception cycle of the downlink data signal in the mobile station UE is changed to the DRX cycle, the mobile station UE cannot receive the TA command transmitted from the radio base station eNB in non-reception periods (periods defined for receiving no downlink data signals).

Accordingly, in the non-reception periods, the mobile station UE cannot detect occurrence of uplink out-of-synchronization, and therefore cannot adjust the transmission timing of uplink data signals.

As a result, the following problem may arise. Specifically, the mobile station UE transmits an uplink data signal (e.g., ACK/NACK being receipt confirmation information in the HARQ process) through uplink shared resources (e.g., UL-SCH: Uplink Shared Channel) set up with the radio base station eNB. Consequently, the uplink data signal interferes with a signal transmitted from a different mobile station UE.

The present invention has been made in consideration of the above problem, and has an objective to provide a mobile communication method, a radio base station, a mobile station, and a processor that allow prevention of a situation in which a signal of a mobile station interferes with a signal transmitted from a different mobile station, even if the mobile station employs the DRX technique.

A first aspect of the present invention is summarized as a mobile communication method in which a mobile station transmits a control signal to a radio base station through uplink dedicated resources, the mobile communication method including the steps of: (A) activating, at the radio base station, a first timer, upon transmission of a downlink data signal to the mobile station operating in a continuous reception cycle; (B) transmitting, from the radio base station to the mobile station, a change instruction instructing the mobile station to change a reception cycle of the mobile station from the continuous reception cycle to a first discontinuous reception cycle, and releasing the uplink dedicated resources, when the first timer expires with no downlink data signal transmitted after the activation of the first timer; and (C) changing, at the mobile station, the reception cycle of the mobile station from the continuous reception cycle to the first discontinuous reception cycle, and releasing the uplink dedicated resources, in response to the received change instruction.

In the first aspect, in the step (B), in addition to transmitting the change instruction, the radio base station can transmit, to the mobile station, an uplink dedicated resource release signal instructing the mobile station to release the uplink dedicated resources; and in the step (C), the mobile station can release the uplink dedicated resources in response to the received uplink dedicated resource release signal.

A second aspect of the present invention is summarized as a mobile communication method in which a mobile station transmits a control signal to a radio base station through uplink dedicated resources, the mobile communication method including the steps of: (A) activating a second timer, when it is determined to change a reception cycle of the mobile station from a continuous reception cycle to a first discontinuous reception cycle; (B) transmitting, from the radio base station to the mobile station, a change instruction instructing the mobile station to change the reception cycle of the mobile station from the first discontinuous reception cycle to a second discontinuous reception cycle longer than the first discontinuous reception cycle, and releasing the uplink dedicated resources, when the second timer expires with no downlink data signal transmitted after the activation of the second timer; and (C) changing, at the mobile station, the reception cycle of the mobile station from the first discontinuous reception cycle to the second discontinuous reception cycle, and releasing the uplink dedicated resources, in response to the received change instruction.

In the second aspect, in the step (B), in addition to transmitting the change instruction, the radio base station can transmit, to the mobile station, an uplink dedicated resource release signal instructing the mobile station to release the uplink dedicated resources; and in the step (C), the mobile station can release the uplink dedicated resources in response to the received uplink dedicated resource release signal.

A third aspect of the present invention is summarized as radio base station that receives a control signal from a mobile station through uplink dedicated resources, the radio base station being configured to: activate a first timer, upon transmission of a downlink data signal to the mobile station operating in a continuous reception cycle; and transmit, to the mobile station, a change instruction instructing the mobile station to change a reception cycle of the mobile station from the continuous reception cycle to a first discontinuous reception cycle, and release the uplink dedicated resources, when the first timer expires with no downlink data signal transmitted after the activation of the first timer.

In the third aspect, the radio base station can be configured to transmit, to the mobile station, an uplink dedicated resource release signal instructing the mobile station to release the uplink dedicated resources, in addition to transmitting the change instruction.

A fourth aspect of the present invention is summarized as radio base station that receives a control signal from a mobile station through uplink dedicated resources, the radio base station being configured to: activate a second timer, when it is determined to change a reception cycle of the mobile station from a continuous reception cycle to a first discontinuous reception cycle; and transmit, to the mobile station, a change instruction instructing the mobile station to change the reception cycle of the mobile station from the first discontinuous reception cycle to a second discontinuous reception cycle longer than the first discontinuous reception cycle, and release the uplink dedicated resources, when the second timer expires with no downlink data signal transmitted after the activation of the second timer.

In the fourth aspect, the radio base station can be configured to transmit, to the mobile station, an uplink dedicated resource release signal instructing the mobile station to release the uplink dedicated resources, in addition to transmitting the change instruction.

A fifth aspect of the present invention is summarized as mobile station that transmits a control signal to a radio base station through uplink dedicated resources, the mobile station being configured to: receive, from the radio base station, a change instruction instructing the mobile station to change a reception cycle of the mobile station from the continuous reception cycle to a first discontinuous reception cycle, when operating in a continuous reception cycle; and change the reception cycle of the mobile station from the continuous reception cycle to the first discontinuous reception cycle, and release the uplink dedicated resources, in response to the received change instruction.

In the fifth aspect, the mobile station can be configured to: receive, from the radio base station, an uplink dedicated resource release signal instructing the mobile station to release the uplink dedicated resources, when operating in the continuous reception cycle; and change the reception cycle from the continuous reception cycle to the first discontinuous reception cycle in response to the received change instruction, and release the uplink dedicated resources in response to the received uplink dedicated resource release signal.

A sixth aspect of the present invention is summarized as a mobile station that transmits a control signal to a radio base station through uplink dedicated resources, the mobile station being configured to: receive, from the radio base station, a change instruction instructing the mobile station to change a reception cycle of the mobile station from the first discontinuous reception cycle to a second discontinuous reception cycle longer than the first discontinuous reception cycle, when operating in a first discontinuous reception cycle; and change the reception cycle of the mobile station from the first discontinuous reception cycle to the second discontinuous reception cycle, and release the uplink dedicated resources, in response to the received change instruction.

In the sixth aspect, the mobile station can be configured to: receive, from the radio base station, an uplink dedicated resource release signal instructing the mobile station to release the uplink dedicated resources, when operating in the first discontinuous reception cycle; and change the reception cycle of the mobile station from the first discontinuous reception cycle to the second discontinuous reception cycle in response to the received change instruction, and release the uplink dedicated resources in response to the received uplink dedicated resource release signal.

A seventh aspect of the present invention is summarized as a processor that generates a control signal transmitted through uplink dedicated resources, the processor being configured to: receive a change instruction instructing to change a reception cycle of a downlink data signal from a continuous reception cycle to a first discontinuous reception cycle, when operating in a continuous reception cycle; and change the reception cycle from the continuous reception cycle to the first discontinuous reception cycle, and release the uplink dedicated resources, in response to the received change instruction.

In the seventh aspect, the processor can be configured to: receive an uplink dedicated resource release signal instructing to release the uplink dedicated resources, when operating in the continuous reception cycle; and change the reception cycle from the continuous reception cycle to the first discontinuous reception cycle in response to the received change instruction, and release the uplink dedicated resources in response to the received uplink dedicated resource release signal.

An eighth aspect of the present invention is summarized as a processor that generates a control signal transmitted through uplink dedicated resources, the processor being configured to: receive a change instruction instructing to change a reception cycle of a downlink data signal from the first discontinuous reception cycle to a second discontinuous reception cycle longer than the first discontinuous reception cycle, when operating in a first discontinuous reception cycle; and change the reception cycle from the first discontinuous reception cycle to the second discontinuous reception cycle, and release the uplink dedicated resources, in response to the received change instruction.

In the eighth aspect, the processor can configured to: receive an uplink dedicated resource release signal instructing to release the uplink dedicated resources, when operating in the first discontinuous reception cycle; and change the reception cycle from the first discontinuous reception cycle to the second discontinuous reception cycle in response to the received change instruction, and release the uplink dedicated resources in response to the received uplink dedicated resource release signal.

As described above, the present invention can provide a mobile communication method, a radio base station, a mobile station, and a processor that allow prevention of a situation in which a signal of a mobile station interferes with a signal transmitted from a different mobile station, even if the mobile station employs the DRX technique.

BEST MODES FOR CARRYING OUT THE INVENTION

Configuration of Mobile Communication System According to First Embodiment of Present Invention Referring to FIGS. 4 to 6, a description will be given of the configuration of a mobile communication system according to a first embodiment of the present invention.

Figure 4:
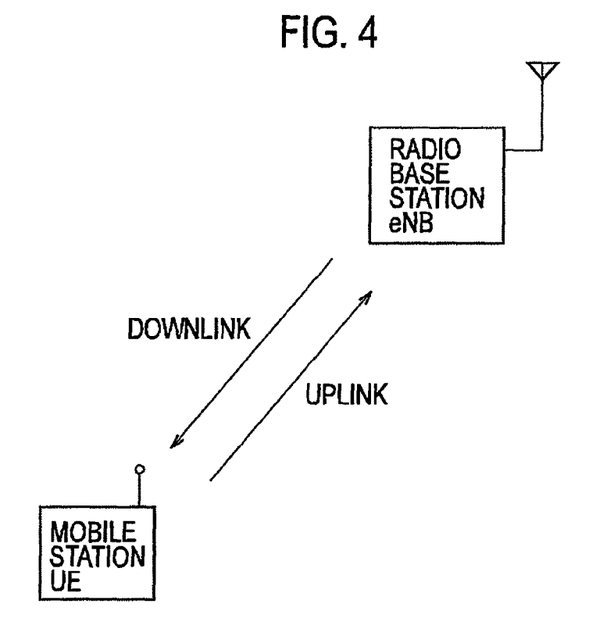
FIG. 4 is a diagram showing the overall configuration a mobile communication system according to a first embodiment of the present invention.

As FIG. 4 shows, the mobile communication system according to the present embodiment includes a radio base station eNB and a mobile station UE.

The radio base station eNB is configured to receive an uplink data signal (e.g., a user data signal) from the mobile station UE through uplink shared resources (e.g., UL-SCH), and to receive a control signal (e.g., Sounding Reference Signal, CQI information, and Scheduling Request) from the mobile station UE through uplink dedicated resources (e.g., PUCCH).

For example, the uplink dedicated resources may be formed of multiple physical channels. In such a case, the radio base station eNB may be configured to receive Sounding Reference Signal, CQI information, and Scheduling Request, through the different respective physical channels.

The radio base station eNB is also configured to transmit a downlink data signal (e.g., a user data signal) to the mobile station UE through downlink shared resources (e.g., DL-SCH).

The mobile station UE is configured to transmit an uplink data signal (e.g., a user data signal) to the radio base station eNB through uplink shared resources (e.g., UL-SCH), and to transmit a control signal (e.g., Sounding Reference Signal, CQI information, and Scheduling Request) to the radio base station eNB through uplink dedicated resources (e.g., PUCCH).

When the uplink dedicated resources are formed of multiple physical channels for example, the mobile station UE may be configured to transmit Sounding Reference Signal, CQI information, and Scheduling Request, through the different respective physical channels.

The mobile station UE is also configured to receive a downlink data signal (e.g., a user data signal) from the radio base station eNB through downlink shared resources (e.g., DL-SCH).

Figure 5:
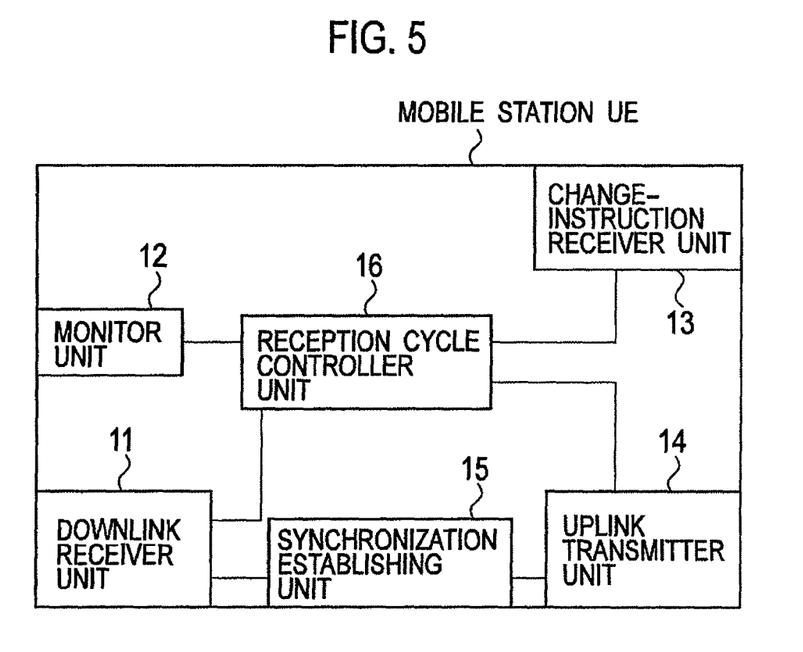
FIG. 5 is a functional block diagram of a mobile station according to the first embodiment of the present invention.

As FIG. 5 shows, the mobile station UE according to the present embodiment includes a downlink receiver unit 11, a monitor unit 12, a change-instruction receiver unit 13, an uplink transmitter unit 14, a synchronization establishing unit 15, and a reception cycle controller unit 16.

The downlink receiver unit 11 is configured to receive a downlink data signal (e.g., a user data signal) transmitted from the radio base station eNB through downlink shared resources (e.g., DL-SCH).

The monitor unit 12 is configured as follows. When the reception cycle of downlink data signals in the mobile station UE is a DRX cycle, in a reception period defined for receiving downlink data signals, the monitor unit 12 monitors whether or not there is any message notifying a presence of a downlink data signal for the mobile station UE, through downlink control channel (e.g., L1/L2 Control Channel).

Note that the reception period is configured to be set by RRC signaling. One reception period may correspond to a period of one sub-frame among sub-frames forming a radio frame, or may correspond to a period of multiple sub-frames among sub-frames forming a radio frame.

The change-instruction receiver unit 13 is configured as follows. From the radio base station, the change-instruction receiver unit 13 receives a change instruction instructing the mobile station UE to change the reception cycle of the mobile station UE from the continuous reception cycle to a first DRX cycle (Short-DRX cycle), when the mobile station UE is operating in a continuous reception cycle.

Here, the second DRX cycle is longer than the first DRX cycle.

For example, the change instruction may be configured to be notified by the radio base station eNB through MAC signaling.

The uplink transmitter unit 14 is configured to transmit an uplink data signal (e.g., a user data signal) to the radio base station eNB through uplink shared resources (e.g., UL-SCH).

The uplink transmitter unit 14 is configured to transmit a control signal (e.g., Sounding Reference Signal, CQI information, and Scheduling Request) to the radio base station eNB through uplink dedicated resources (e.g., PUCCH).

The uplink transmitter unit 14 may also be configured to release the uplink dedicated resources (e.g., PUCCH) being allocated to the mobile station UE, when it is determined to change the reception cycle of a downlink data signal in the mobile station UE from a continuous reception cycle to a first DRX cycle (Short-DRX cycle).

Note that, when the uplink dedicated resources are formed by multiple physical channels, the uplink transmitter unit 14 is configured to release all the physical channels.

The synchronization establishing unit 15 is configured to establish uplink synchronization between the radio base station eNB and the mobile station UE, and to thus set up uplink dedicated resources between the radio base station eNB and the mobile station UE, when transmission of uplink data signals is to be resumed.

Moreover, the synchronization establishing 15 is configured to establish uplink synchronization between the radio base station eNB and the mobile station UE, and to thus set up uplink dedicated resources between the radio base station eNB and the mobile station UE, when transmission of a downlink data signals is to be resumed.

The reception cycle controller unit 16 is configured to control the reception cycle of a downlink data signal in the mobile station UE.

In response to the change instruction received by the change-instruction receiver unit 13, the reception cycle controller unit 16 determines to change the reception cycle of a downlink data signal in the mobile station UE either from the continuous reception cycle to the first DRX cycle (Short-DRX cycle) or from the first DRX cycle (Short-DRX cycle) to the second DRX cycle (Long-DRX cycle).

Here, the reception cycle controller unit 16 determines to start the first DRX cycle (Short-DRX cycle) or the second DRX cycle (Long-DRX cycle), according to the DRX cycle specified by MAC signaling (according a cycle In which a reception period occurs).

Figure 6:
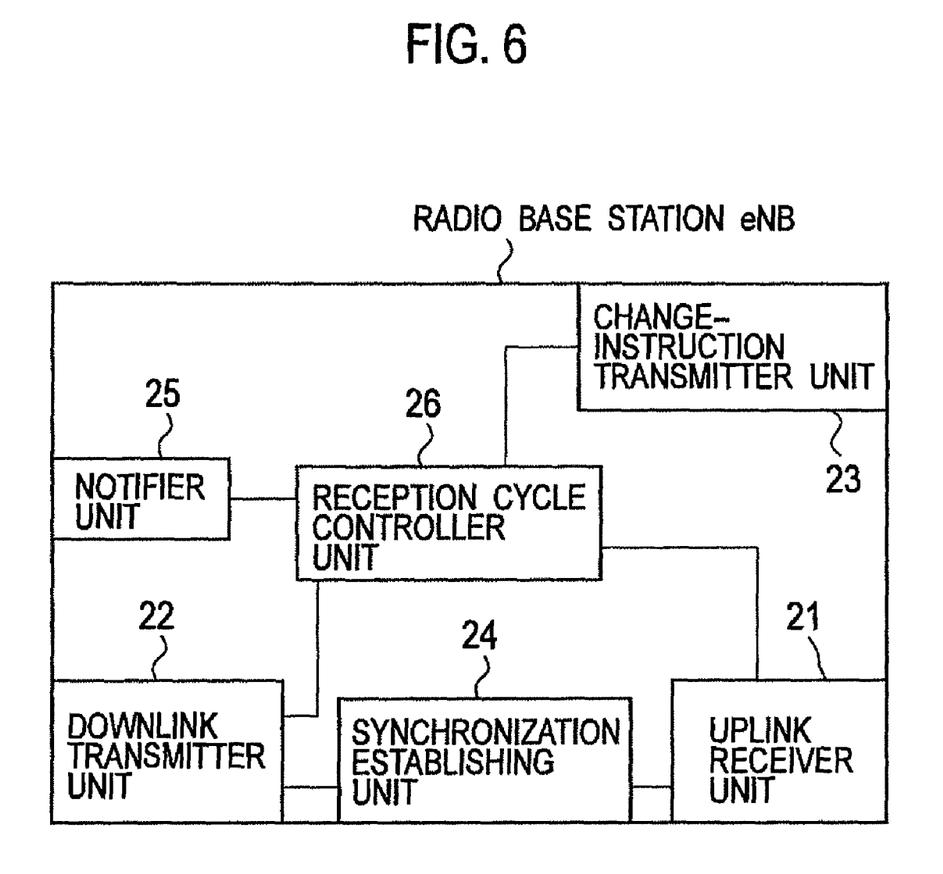
FIG. 6 is a functional block diagram of a radio base station according to the first embodiment of the present invention.

As FIG. 6 shows, the radio base station eNB according to the present embodiment includes an uplink receiver unit 21, a downlink transmitter unit 22, a change-instruction transmitter unit 23, a synchronization establishing unit 24, a notifying unit 25, and a reception cycle controller unit 26.

The uplink receiver unit 21 is configured to receive an uplink data signal (e.g., a user data signal) transmitted from the mobile station UE through uplink shared resources (e.g., UL-SCH).

The uplink receiver unit 21 is configured to receive a control signal (e.g., Sounding Reference Signal, CQI information, and Scheduling Request) transmitted from the mobile station UE through uplink dedicated resources (e.g., PUCCH).

The uplink receiver unit 21 may also be configured to release the uplink dedicated resources (e.g., PUCCH) being allocated to the mobile station UE, when it is determined to change the reception cycle of a downlink data signal in the mobile station UE from the continuous reception cycle to the first DRX cycle (Short-DRX).

Note that, when the uplink dedicated resources are formed by multiple physical channels, the uplink receiver unit 21 is configured to release all the physical channels.

The downlink transmitter unit 22 is configured to transmit a downlink data signal (e.g., user data signal) to the mobile station UE through downlink shared resources (e.g., DL-SCH).

The change-instruction transmitter unit 23 is configured to transmit either a change instruction instructing the mobile station UE to change the reception cycle of a downlink data signal in the mobile station UE from the continuous reception cycle to the first DRX cycle (Short-DRX cycle), or a change instruction instructing the mobile station UE to change the reception cycle of a downlink data signal in the mobile station UE from the first DRX cycle (Short-DRX cycle) to the second DRX cycle (Long-DRX cycle), in response to the instruction from the reception cycle controller unit 26.

For example, the change-instruction transmitter unit 23 is configured to notify the change instruction through MAC signaling.

The synchronization establishing unit 24 is configured to establish uplink synchronization between the radio base station eNB and the mobile station UE, and to thus set up uplink dedicated resources between the radio base station eNB and the mobile station UE, when transmission of uplink data signals is to be resumed.

Moreover, the synchronization establishing unit 24 is configured to establish uplink synchronization between the radio base station eNB and the mobile station UE, and to thus set up uplink dedicated resources between the radio base station eNB and the mobile station UE, when transmission of downlink data signals is to be resumed.

The notifying unit 25 is configured as follows. When the reception cycle of a downlink data signal in the mobile station UE is the DRX cycle, in the above-described reception period, the notifying unit 25 notifies that there is a message notifying a presence of a downlink data signal for the mobile station UE, through downlink control channel (e.g., L1/L2 Control Channel).

The reception cycle controller unit 26 is configured to control the reception cycle of a downlink data signal in the mobile station UE.

When no downlink data signal is transmitted from the downlink transmitter unit 22 for a predetermined period to the mobile station UE operating in the continuous reception cycle, the reception cycle controller unit 26 determines to change the reception cycle of a downlink data signal in the mobile station UE from the continuous reception cycle to the first DRX cycle (Short-DRX cycle), and gives such instruction to the change-instruction transmitter unit 23.

Specifically, the reception cycle controller unit 26 activates an Inactive timer A (first timer) upon transmission of a downlink data signal through downlink shared resources to the mobile station UE operating in the continuous reception cycle, and determines to change the reception cycle of the mobile station UE from the continuous reception cycle to the first DRX cycle (Short-DRX cycle), when the Inactive timer A (first timer) expires with no downlink data signal transmitted after the activation of the Inactive timer A.

Further, when no downlink data signal is transmitted from the downlink transmitter unit 22 for a predetermined period while the mobile station UE is operating in the first DRX cycle (Short-DRX cycle), the reception cycle controller unit 26 determines to change the reception cycle of a downlink data signal in the mobile station UE from the first DRX cycle (Short-DRX cycle) to the second DRX cycle (Long-DRX cycle), and gives such instruction to the change-instruction transmitter unit 23.

Specifically, the reception cycle controller unit 26 activates an Inactive timer B (second timer), when it is determined to change the reception cycle of the mobile station UE from the continuous reception cycle to the first DRX cycle (Short-DRX cycle), and determines to change the reception cycle of a downlink data signal in the mobile station UE from the first DRX cycle (Short-DRX cycle) to the second DRX cycle (Long-DRX cycle), when the Inactive timer B (second timer)

expires with no downlink data signal transmitted after the activation of the Inactive timer B (second timer).

Note that part or all of the functions (modules) constituting the mobile station UE shown in FIG. 5 and the radio base station eNB shown in FIG. 6 may be configured to be implemented with a general-purpose processor, a DSP (Digital Signal Processor), an ASIC (Application Specific Integrated Circuit), an FPGA (Field Programmable Gate Array), discrete gate or transistor logic, discrete hardware components, any combination of these, or the like.

Figure 11:
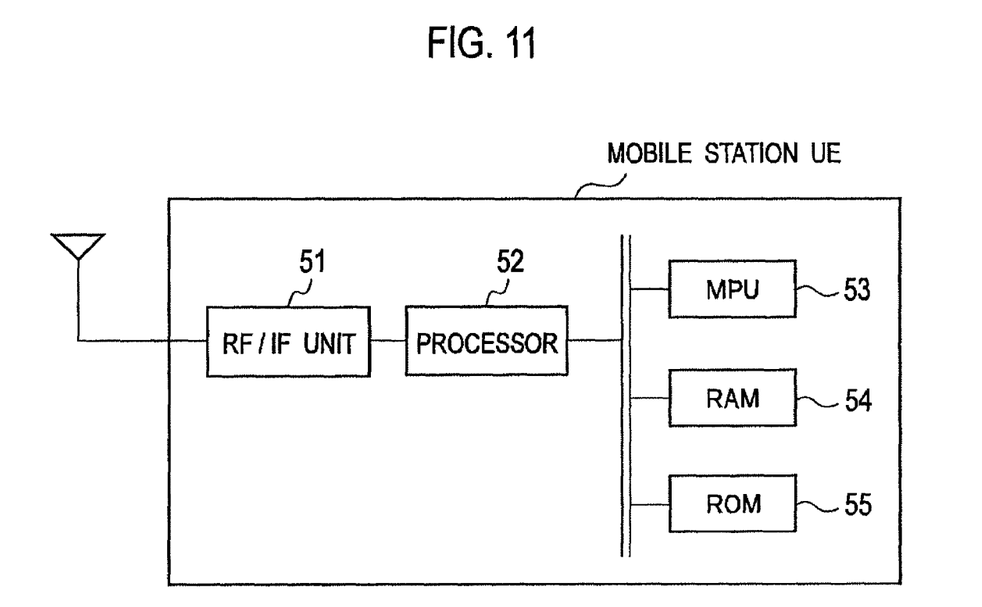
FIG. 11 is a diagram showing an example of the hardware configuration of the mobile station according to each embodiment of the present invention.

As an example, a case is described in which the mobile station UE includes an RF/IF unit 51 performing radio signal processing, a processor 52 performing baseband signal processing, an MPU (Micro Processing Unit) 53 executing applications, a RAM (Random Access Memory) 54, and a ROM (Read Only Memory), as shown in FIG. 11.

In such a case, the processor 52 of the mobile station UE may be configured with a general-purpose processor, a DSP, an ASIC, an FPGA, discrete gate or transistor logic, discrete hardware components, any combination of these, or the like, and may implement part or all of the functions (modules) constituting the mobile station UE shown in FIG. 5. The description given here takes the mobile station UE as an example; however, with the processor configured as above, the radio base station eNB may be configured to implement part or all of the functions (modules) constituting the radio base station eNB shown in FIG. 6. Here, the general-purpose processor may be a microprocessor or may be a conventional processor, a controller, a microcontroller, or a state machine.

Moreover, the processor may be implemented as any selected combination of computing devices, such as a combination of a DSP and a microprocessor, a combination of multiple microprocessors, or a combination of single or multiple microprocessors and a DSP core.

(Operation of Mobile Communication System According to First Embodiment of Present Invention)

Figure 7:
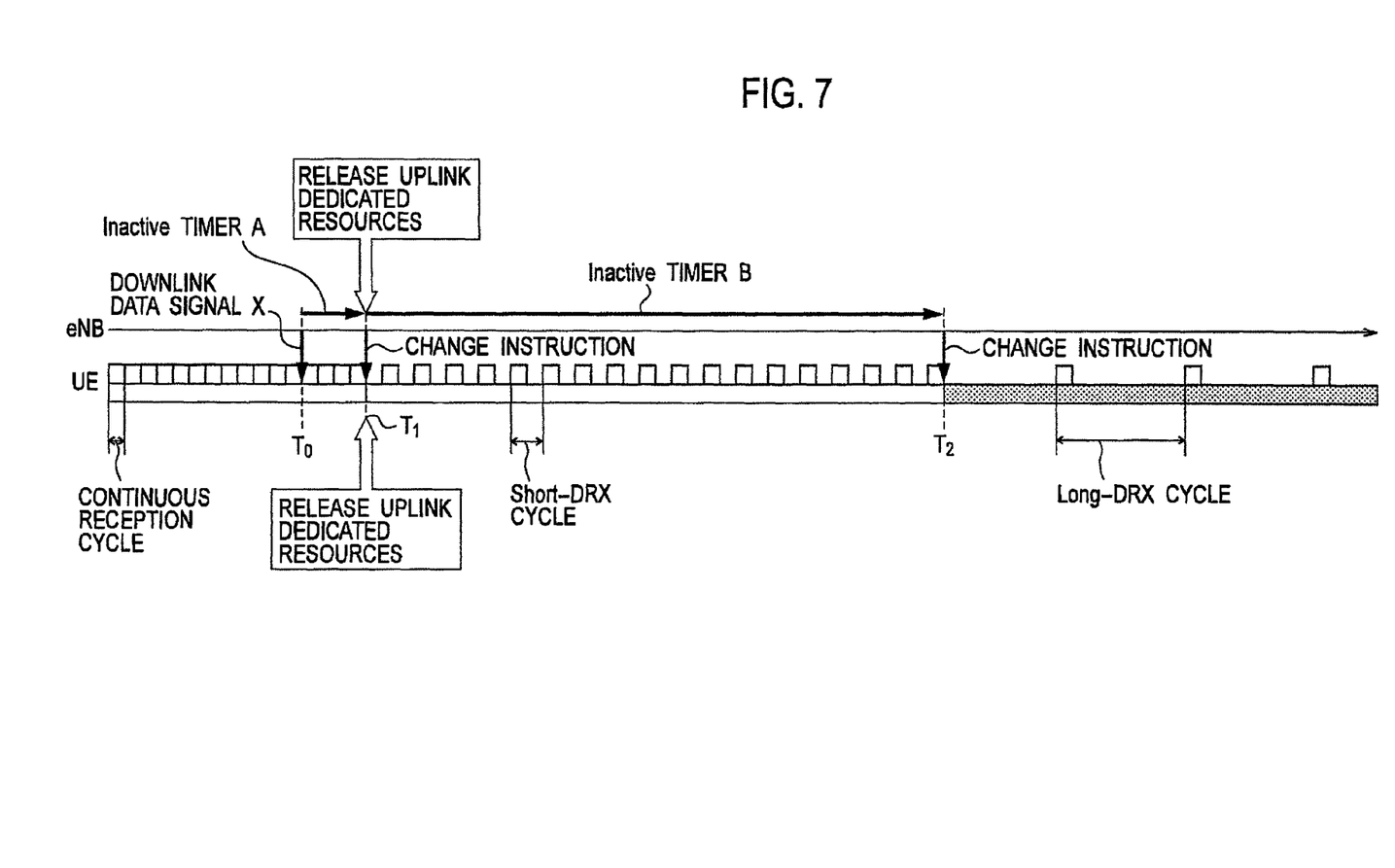
FIG. 7 is a diagram illustrating an operation of the mobile communication system according to the first embodiment of the present invention.

Referring to FIG. 7, a description will be given of an operation of the mobile communication system according to the first embodiment of the present invention.

As FIG. 7 shows, at Time T0, the downlink transmitter unit 22 of the radio base station eNB transmits a downlink data signal X through downlink shared resources (e.g., DL-SCH), and the downlink receiver unit 11 of the mobile station UE operating in the continuous reception cycle receives the downlink data signal X through the downlink shared resources.

In response, the reception cycle controller unit 26 of the radio base station eNB activates the Inactive timer A (first timer).

Thereafter, the Inactive timer A expires at Time T1 since no downlink data signal has been transmitted from the downlink transmitter unit 22 of the radio base station eNB through the downlink shared resources between Time T0 and Time T1.

In response, the reception cycle controller unit 26 of the radio base station eNB and the reception cycle controller unit 16 of the mobile station UE each determine to change the reception cycle of the mobile station UE from the continuous reception cycle to the first DRX cycle (Short-DRX cycle). In response to the determination result, the uplink receiver unit 21 of the radio base station eNB and the uplink transmitter unit 14 of the mobile station UE each release uplink dedicated resources being allocated to the mobile station UE.

In addition, in response to the aforementioned determination result, the change-instruction transmitter unit 23 of the radio base station eNB transmits a change instruction instructing the mobile station UE to change the reception cycle of the mobile station UE, and the reception cycle controller unit 26 of the radio base station eNB activates the Inactive timer B (second timer).

Then, in response to the change instruction received from the radio base station eNB, the reception cycle controller unit 16 of the mobile station UE determines to change the reception cycle of the mobile station UE from the continuous reception cycle to the first DRX cycle (Short-DRX cycle), and the uplink transmitter unit 14 of the mobile station UE releases the uplink dedicated resources.

Thereafter, the Inactive timer B expires at Time T2 since no downlink data signal has been transmitted from the downlink transmitter unit 22 of the radio base station eNB through the downlink shared resources between Time T1 and Time T2.

In response, the reception cycle controller unit 26 of the radio base station eNB transmits a change instruction instructing the mobile station UE to change the reception cycle of the mobile station UE.

Then, in response to the change instruction received from the radio base station eNB, the reception cycle controller unit 16 of the mobile station UE determines to change the reception cycle of the mobile station UE from the first DRX cycle (Short-DRX cycle) to the second DRX cycle (Long-DRX cycle).

Note that the above operation of the mobile station UE and the radio base station eNB may be implemented by hardware, by a software module executed by a processor, or by a combination of both.

Generally, software which supports radio protocols, such as RRC, RLC, MAC, and PHY, is called a protocol stack (software), and in the software, the lower-ranked protocols (e.g., PHY and MAC) tend to be implemented by hardware as a semiconductor processor. Size reduction and power saving are demanded especially of the mobile stations UE, and therefore the operation of the mobile station UE tends to be implemented by hardware as a semiconductor processor. Moreover, also for small base stations (femtocell Home eNB), there are similar needs for size reduction and power saving. Accordingly, the operation of such base stations may be implemented by hardware as a semiconductor processor.

The software module may be provided in a storage medium of any form, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and on the storage medium. The storage medium may be integrated on the processor. The storage medium and the processor may be provided in an ASIC. The ASIC may be provided in the mobile station UE and the radio base station eNB. Moreover, the storage medium and the processor may be provided in the mobile station UE and the radio base station eNB as discrete components.

(Advantageous Effects of Mobile Communication System According to First Embodiment of Present Invention)

In the mobile communication system according to the first embodiment of the present invention, the uplink dedicated resources are configured to be released before the reception cycle of the mobile station UE is changed to the first DRX cycle (Short-DRX period) or to the second DRX cycle (Long-DRX period). Accordingly, a situation is avoided in which the mobile station UE transmits an uplink data signal without knowing the occurrence of out-of-synchronization in the downlink because the mobile station UE cannot receive a TA command in a non-reception period.

(Mobile Communication System According to Second Embodiment of Present Invention)

Figure 8:
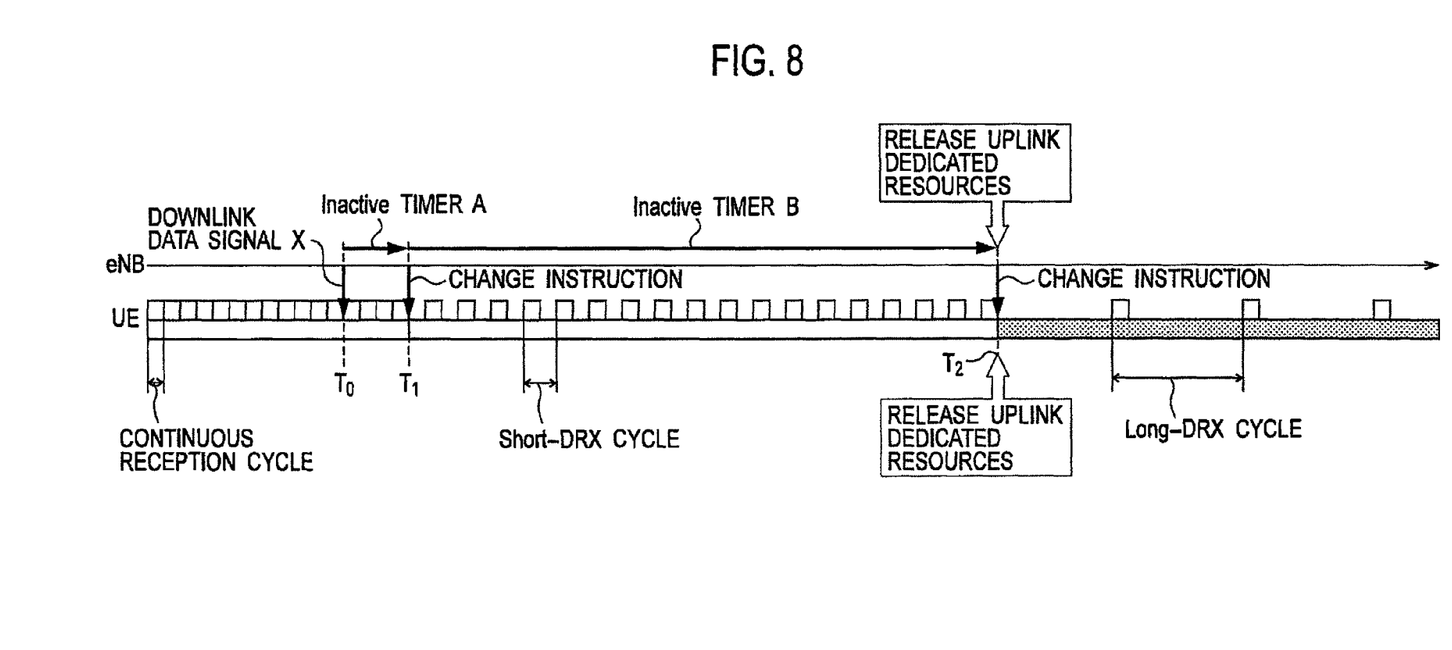
FIG. 8 is a diagram illustrating an operation of a mobile communication system according to a second embodiment of the present invention.

Referring to FIG. 8, a description will be given of a mobile, communication system according to a second embodiment of the present invention.

What is mainly described below is difference between the mobile communication system according to the second embodiment of the present invention and the mobile communication system according to the first embodiment described above.

The uplink transmitter unit 14 of the mobile station UE according to the present embodiment is configured to release the uplink dedicated resources being allocated to the mobile station UE, when it is determined to change the reception cycle of a downlink data signal in the mobile station UE from the first DRX cycle (Short-DRX cycle) to the second DRX cycle (Long-DRX cycle).

Moreover, the uplink receiver unit 21 of the radio base station eNB according to the present embodiment is configured to release the uplink dedicated resources (e.g., PUCCH) being allocated to the mobile station UE, when it is determined to change the reception cycle of a downlink data signal in the mobile station UE from the first DRX cycle (Short-DRX cycle) to the second DRX cycle (Long-DRX cycle).

Referring to FIG. 8, a description will be given of an operation of the mobile communication system according to the second embodiment of the present invention.

As FIG. 8 shows, at Time T0, the downlink transmitter unit 22 of the radio base station eNB transmits a downlink data signal X through downlink shared resources (e.g., DL-SCH), and the downlink receiver unit 11 of the mobile station UE operating in the continuous reception cycle receives the downlink data signal X through the downlink shared resources.

At this time, the reception cycle controller unit 26 of the radio base station eNB activates the Inactive timer A (first timer).

Thereafter, the Inactive timer A expires at Time T1 since no downlink data signal has been transmitted from the downlink transmitter unit 22 of the radio base station eNB through the downlink shared resources between Time T0 and Time T1.

In response, the reception cycle controller unit 26 of the radio base station eNB determines to change the reception cycle of the mobile station UE from the continuous reception cycle to the first DRX cycle (Short-DRX cycle). In response to the determination result obtained above, the change-instruction transmitter unit 23 of the radio base station eNB transmits a change instruction instructing the mobile station UE to change the reception cycle of the mobile station UE, and the reception cycle controller unit 26 of the radio base station eNB activates the Inactive timer B (second timer).

Thereafter, the Inactive timer B expires at Time T2 since no downlink data signal has been transmitted from the downlink transmitter unit 22 of the radio base station eNB through the downlink shared resources between Time T1 and Time T2.

In response, the reception cycle controller unit 26 of the radio base station eNB determines to change the reception cycle of the mobile station UE from the first DRX cycle (Short-DRX cycle) to the second DRX cycle (Long-DRX cycle). In response to the determination result obtained above, the uplink receiver unit 21 of the radio base station eNB releases the uplink dedicated resources being allocated to the mobile station UE.

Moreover, in response to the aforementioned determination result, the change-instruction transmitter unit 23 of the radio base station eNB transmits a change instruction instructing the mobile station UE to change the reception cycle of the mobile station UE.

Then, in response to the change instruction received from the radio base station eNB, the reception cycle controller unit 16 of the mobile station UE determines to change the reception cycle of the mobile station UE from the first DRX cycle (Short-DRX cycle) to the second DRX cycle (Long-DRX cycle). In response to the received change instruction, the uplink transmitter unit 14 of the mobile station UE releases the uplink dedicated resources.

(Mobile Communication System According to Third Embodiment of Present Invention)

Figure 9:
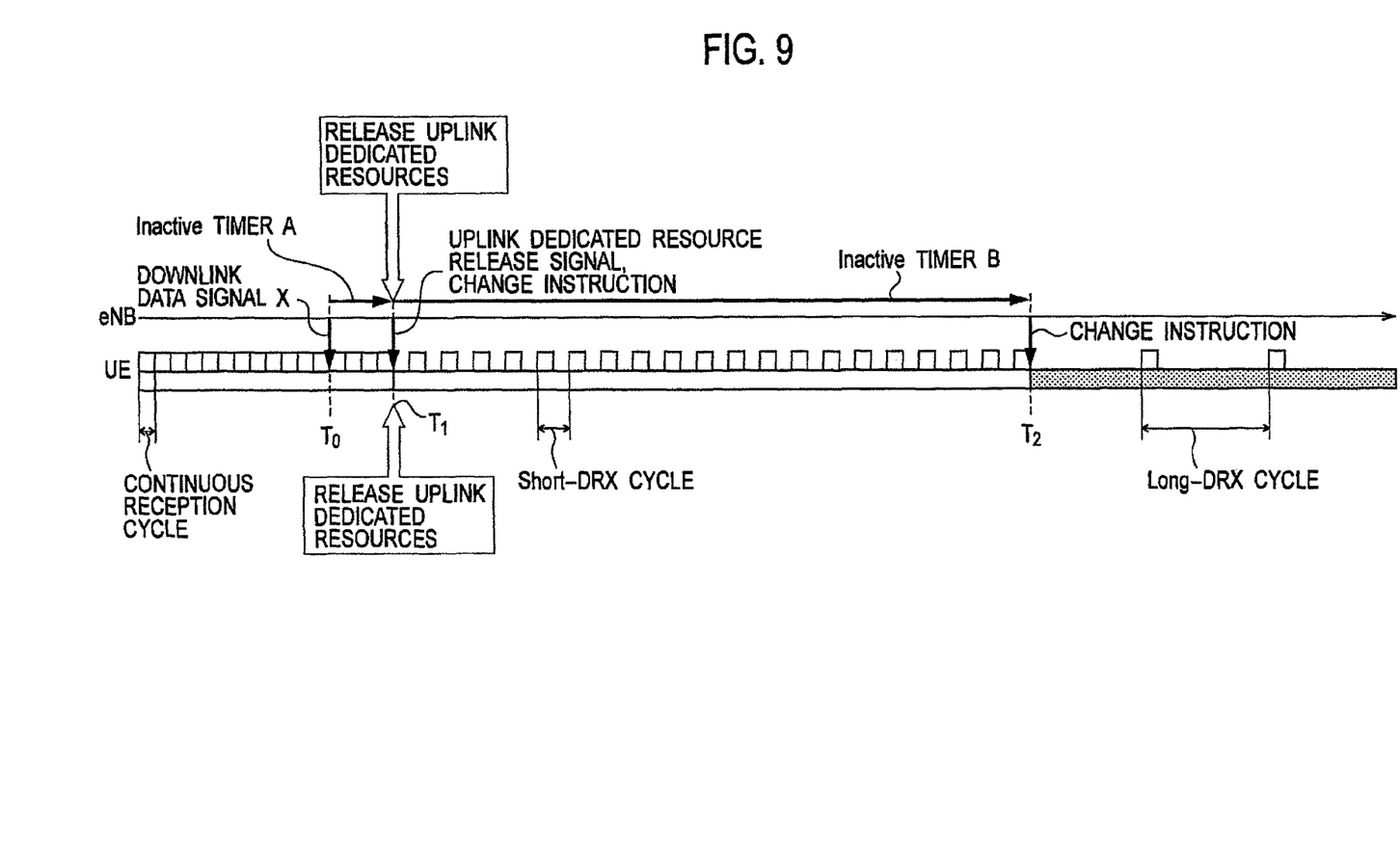
FIG. 9 is a diagram illustrating an operation of a mobile communication system according to a third embodiment of the present invention.

Referring to FIG. 9, a description will be given of a mobile communication system according to a third embodiment of the present invention.

What is mainly described below is difference between the mobile communication system according to the third embodiment of the present invention and the mobile communication system according to the first embodiment described above.

In the radio base station eNB according to the present embodiment, when the Inactive time A (first timer) expires with no downlink data signal transmitted after the activation of the Inactive timer A (first timer), the uplink receiver unit 21 releases the uplink dedicated resources, and the downlink transmitter unit 22 transmits an uplink dedicated resource release signal instructing the mobile station UE to release the uplink dedicated resources, to the mobile station UE through downlink shared resources.

Further, in such a case, in the radio base station eNB according to the present embodiment, the change instructor transmitter unit 23 is configured to transmit a change instruction instructing the mobile station UE to change the reception cycle of the mobile station UE.

The mobile station UE according to the present embodiment is configured as follows. Specifically, when the downlink receiver unit 11 receives the above-described uplink dedicated resource release signal, the uplink transmitter unit 14 releases the uplink dedicated resources in response to the instruction of the uplink dedicated resource release signal thus received.

Referring to FIG. 9, a description will be given of an operation of the mobile communication system according to the third embodiment of the present invention.

As FIG. 9 shows, at Time T0, the downlink transmitter unit 22 of the radio base station eNB transmits a downlink data signal X through downlink shared resources, and the downlink receiver unit 11 of the mobile station UE operating in the continuous reception cycle receives the downlink data signal X through the downlink shared resources.

At this time, the reception cycle controller unit 26 of the radio base station eNB activates the Inactive timer A (first timer).

Thereafter, the Inactive timer A expires at Time T1 since no downlink data signal has been transmitted from the downlink transmitter unit 22 of the radio base station eNB through the downlink shared resources between Time T0 and Time T1.

In response, the reception cycle controller unit 26 of the radio base station eNB determines to change the reception cycle of the mobile station UE from the continuous reception cycle to the first DX cycle (Short-DRX cycle).

Further, in response to the determination result obtained above, the uplink receiver unit 21 of the radio base station eNB releases the uplink dedicated resources being allocated to the mobile station UE, and the downlink transmitter unit 22 of the radio base station eNB transmits a uplink dedicated resource release signal instructing the mobile station UE to release the uplink dedicated resources, to the mobile station UE through downlink shared resources. Also, the change instructor transmitter unit 23 of the radio base station eNB transmits a change instruction instructing the mobile station UE to change the reception cycle of the mobile station UE.

At this time, the reception cycle controller unit 26 of the radio base station eNB activates the Inactive timer B (second timer).

Then, the reception cycle controller unit 16 of the mobile station UE changes the reception cycle of the mobile station UE from the continuous reception cycle to the first DRX cycle (Short-DRX cycle) in response to the received change instruction, and the uplink transmitter unit 14 of the mobile station UE releases the uplink dedicated resources in response to the instruction by the received uplink dedicated resource release signal.

Thereafter, the Inactive timer B expires at Time T2 since no downlink data signal has been transmitted from the downlink transmitter unit 22 of the radio base station eNB through the downlink shared resources between Time T1 and Time T2.

In response, the reception cycle controller unit 26 of the radio base station eNB transmits a change instruction instructing the mobile station UE to change the reception cycle of the mobile station UE. In response to the received change instruction, the reception cycle controller unit 16 of the mobile station UE changes the reception cycle of the mobile station UE from the first DRX cycle (Short-DRX cycle) to the second DRX cycle (Long-DRX cycle).

(Mobile Communication System According to Fourth Embodiment of Present Invention)

Figure 10:
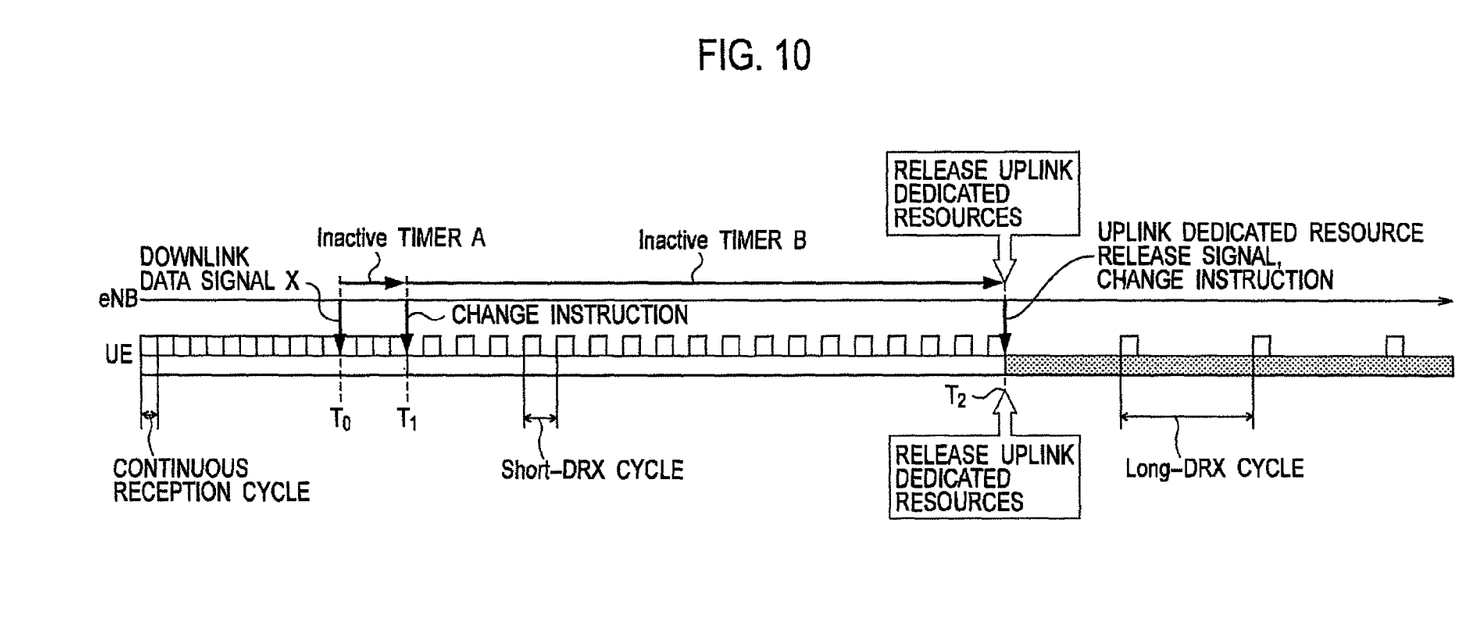
FIG. 10 is a diagram illustrating an operation of a mobile communication system according to a fourth embodiment of the present invention.

Referring to FIG. 10, a description will be given of a mobile communication system according to a fourth embodiment of the present invention.

What is mainly described below is difference between the mobile communication system according to the fourth embodiment of the present invention and the mobile communication system according to the first embodiment described above.

The radio base station eNB according to the present embodiment is configured as follows. Specifically, when the Inactive timer B (second timer) expires with no downlink data signal transmitted after the activation of the Inactive timer B (second timer), the uplink receiver unit 21 releases the uplink dedicated resources, and the downlink transmitter unit 22 transmits an uplink dedicated resource release signal, instructing the mobile station UE to release the uplink dedicated resources, to the mobile station UE through downlink shared resources.

Further, in such a case, in the radio base station eNB according to the present embodiment, the change instructor transmitter unit 23 is configured to transmit a change instruction instructing the mobile station UE to change the reception cycle of the mobile station UE.

The mobile station UE according to the present embodiment is configured as follows. Specifically, when the downlink receiver unit 11 receives the above-described uplink dedicated resource release signal, the uplink transmitter unit 14 releases the uplink dedicated resources in response to the instruction of the uplink dedicated resource release signal thus received.

Referring to FIG. 10, a description will be given of an operation of the mobile communication system according to the fourth embodiment of the present invention.

As FIG. 10 shows, at Time T0, the downlink transmitter unit 22 of the radio base station eNB transmits a downlink data signal X through downlink shared resources, and the downlink receiver unit 11 of the mobile station UE operating in the continuous reception cycle receives the downlink data signal X through the downlink shared resources.

At this time, the reception cycle controller unit 26 of the radio base station eNB activates the Inactive timer A (first timer).

Thereafter, the Inactive timer A expires at Time T1 since no downlink data signal has been transmitted from the downlink transmitter unit 22 of the radio base station eNB through the downlink shared resources between Time T0 and Time T1.

In response, the reception cycle controller unit 26 of the radio base station eNB determines to change the reception cycle of the mobile station UE from the continuous reception cycle to the first DRX cycle (Short-DRX cycle). In response to the determination result, the change-instruction transmitter unit 23 of the radio base station eNB transmits a change instruction instructing the mobile station UE to change the reception cycle of the mobile station UE.

Thereafter, at Time T2, the reception cycle controller unit 26 of the radio base station eNB activates the Inactive timer B (first timer).

Then, in response to the received change instruction, the reception cycle controller unit 16 of the mobile station UE changes the reception cycle of the mobile station UE from the continuous reception cycle to the first DRX cycle (Short-DRX cycle)

Thereafter, the Inactive timer B expires at Time T2 since no downlink data signal has been transmitted from the downlink transmitter unit 22 of the radio base station eNB through the downlink shared resources between Time T1 and Time T2.

In response, the reception cycle controller unit 26 of the radio base station eNB determines to change the reception cycle of the mobile station UE from the first DRX cycle (Short-DRX cycle) to the second DRX cycle (Long-DRX cycle). In response to the determination result, the change-instruction transmitter unit 23 of the radio base station eNB transmits a change instruction instructing the mobile station UE to change the reception cycle of the mobile station UE.

In addition, in response to the above-mentioned determination result, the uplink receiver unit 21 of the radio base station eNB releases the uplink dedicated resources being allocated to the mobile station UE, and the downlink transmitter unit 22 of the radio base station eNB transmits an uplink dedicated resource release signal, instructing the mobile station UE to release the uplink dedicated resources, to the mobile station UE through downlink shared resources.

Thereafter, the reception cycle controller unit 16 of the mobile station UE changes the reception cycle of the mobile station UE from the first DRX cycle (Short-DRX cycle) to the second DRX cycle (Long-DRX cycle) in response to the received change instruction, and the uplink transmitter unit 14 of the mobile station UE releases the uplink dedicated resources in response to the instruction by the received uplink dedicated resource release signal.

The present invention has been described above using the embodiments given above. However, it is apparent to those skilled in the art that the present invention is not limited to the embodiments described herein. The present invention may be carried out as modified or corrected forms without departing from the spirit and scope of the present invention defined by the appended claims. Therefore, the description given herein is for illustrative purposes only and is not intended to limit the present invention whatsoever.

Note that the entire content of Japanese Patent Application No. 2007-114899 (filed on Apr. 24, 2007) is incorporated herein by reference.

INDUSTRIAL APPLICABILITY

As described, the present invention can provide a mobile communication method, a radio base station, a mobile station, and a processor that allow prevention of a situation in which a signal of a mobile station interferes with a signal transmitted from a different mobile station, even if the mobile station employs the DRX technique. Accordingly, the mobile communication method, radio base station, mobile station, and processor according to the present invention are useful in radio communications such as mobile communications.

The invention claimed is:

1. A mobile communication method in which a mobile station transmits a control signal to a radio base station through uplink dedicated resources, the mobile communication method comprising the steps of:
   (A) activating a second timer, when it is determined to change a reception cycle of the mobile station from a continuous reception cycle to a first discontinuous reception cycle;
   (B) transmitting, from the radio base station to the mobile station, a change instruction instructing the mobile station to change the reception cycle of the mobile station from the first discontinuous reception cycle to a second discontinuous reception cycle longer than the first discontinuous reception cycle, and releasing the uplink dedicated resources, when the second timer expires with no downlink data signal transmitted after the activation of the second timer; and
   (C) changing, at the mobile station, the reception cycle of the mobile station from the first discontinuous reception cycle to the second discontinuous reception cycle, and releasing the uplink dedicated resources, in response to the received change instruction.

2. The mobile communication method according to claim 1, wherein
   in the step (B), in addition to transmitting the change instruction, the radio base station transmits, to the mobile station, an uplink dedicated resource release signal instructing the mobile station to release the uplink dedicated resources; and
   in the step (C), the mobile station releases the uplink dedicated resources in response to the received uplink dedicated resource release signal.

3. A radio base station that receives a control signal from a mobile station through uplink dedicated resources, the radio base station being configured to:
   activate a second timer, when it is determined to change a reception cycle of the mobile station from a continuous reception cycle to a first discontinuous reception cycle; and
   transmit, to the mobile station, a change instruction instructing the mobile station to change the reception cycle of the mobile station from the first discontinuous reception cycle to a second discontinuous reception cycle longer than the first discontinuous reception cycle, and release the uplink dedicated resources, when the second timer expires with no downlink data signal transmitted after the activation of the second timer.

4. The radio base station according to claim 3, wherein
   the radio base station is configured to transmit, to the mobile station, an uplink dedicated resource release signal instructing the mobile station to release the uplink dedicated resources, in addition to transmitting the change instruction.

5. A mobile station that transmits a control signal to a radio base station through uplink dedicated resources, the mobile station being configured to:
   receive, from the radio base station, a change instruction instructing the mobile station to change a reception cycle of the mobile station from the first discontinuous reception cycle to a second discontinuous reception cycle longer than the first discontinuous reception cycle, when operating in a first discontinuous reception cycle; and
   change the reception cycle of the mobile station from the first discontinuous reception cycle to the second discontinuous reception cycle, and release the uplink dedicated resources, in response to the received change instruction.

6. The mobile station according to claim 5, wherein
   the mobile station is configured to:
   receive, from the radio base station, an uplink dedicated resource release signal instructing the mobile station to release the uplink dedicated resources, when operating in the first discontinuous reception cycle; and
   change the reception cycle of the mobile station from the first discontinuous reception cycle to the second discontinuous reception cycle in response to the received change instruction, and release the uplink dedicated resources in response to the received uplink dedicated resource release signal.

7. A processor that generates a control signal transmitted through uplink dedicated resources, the processor being configured to:
   receive a change instruction instructing to change a reception cycle of a downlink data signal from the first discontinuous reception cycle to a second discontinuous reception cycle longer than the first discontinuous reception cycle, when operating in a first discontinuous reception cycle; and
   change the reception cycle from the first discontinuous reception cycle to the second discontinuous reception cycle, and release the uplink dedicated resources, in response to the received change instruction.

8. The processor according to claim 7, wherein
   the processor is configured to:
   receive an uplink dedicated resource release signal instructing to release the uplink dedicated resources, when operating in the first discontinuous reception cycle; and
   change the reception cycle from the first discontinuous reception cycle to the second discontinuous reception cycle in response to the received change instruction, and release the uplink dedicated resources in response to the received uplink dedicated resource release signal.

* * * * *